United States Patent [19]

Okabe

[11] Patent Number: 4,527,897

[45] Date of Patent: Jul. 9, 1985

[54] APPARATUS FOR DETECTING SPECIFIC COLOR

[75] Inventor: Yoshie Okabe, Yokohama, Japan

[73] Assignee: Tokyo Shibaura Denki Kabushiki Kaisha, Kawasaki, Japan

[21] Appl. No.: 418,003

[22] Filed: Sep. 14, 1982

[30] Foreign Application Priority Data

Sep. 18, 1981 [JP] Japan .................. 56-147209

[51] Int. Cl.³ ............................................. G01J 3/50
[52] U.S. Cl. .................................. 356/407; 356/406; 356/425; 250/226
[58] Field of Search ............. 356/406, 407, 416, 419, 356/425, 71; 250/226, 568; 235/465, 466

[56] References Cited

U.S. PATENT DOCUMENTS 3,127,517 3/1964 Kestenbaum .
3,527,540 9/1970 Bowker et al. ................. 356/406
3,809,892 5/1974 Schober ......................... 250/226

FOREIGN PATENT DOCUMENTS 2108527 9/1972 Fed. Rep. of Germany ...... 250/568
2726828 12/1977 Fed. Rep. of Germany ...... 356/407
3038499 4/1981 Fed. Rep. of Germany .

Primary Examiner—F. L. Evans
Assistant Examiner—Joel L. Harringa
Attorney, Agent, or Firm—Cushman, Darby & Cushman

[57] ABSTRACT

An apparatus for detecting a specific color, which comprises color difference detectors each of which takes the difference between an electric signal representing a specific color and an electric signal representing a different color component for increasing the amplitude of the different color electric signal. The signal from the color difference detectors is indicative of whether or not there is a pattern of the specific color. The apparatus further comprises a circuit for discriminating the specific color. The signals from this discriminating circuit are added by an adder to amplify their amplitudes. The signal from the adder and the signal from the color difference detector are ANDed to obtain a specific color signal.

4 Claims, 16 Drawing Figures

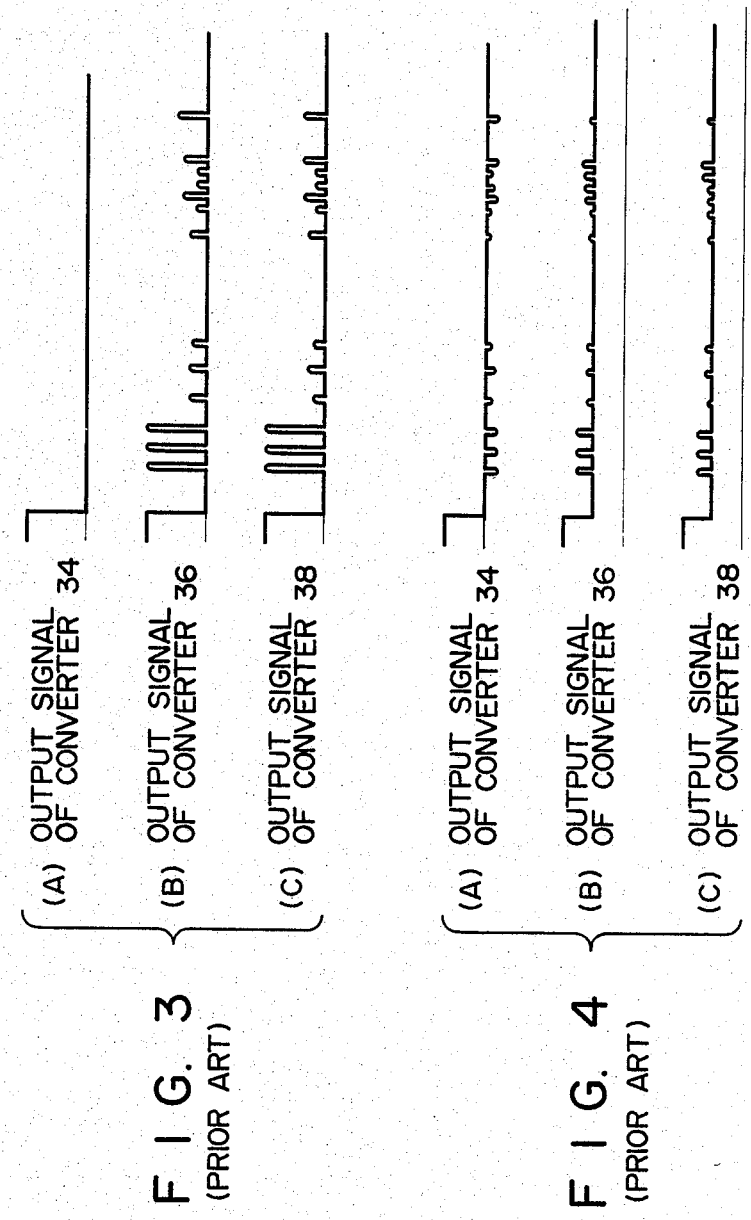

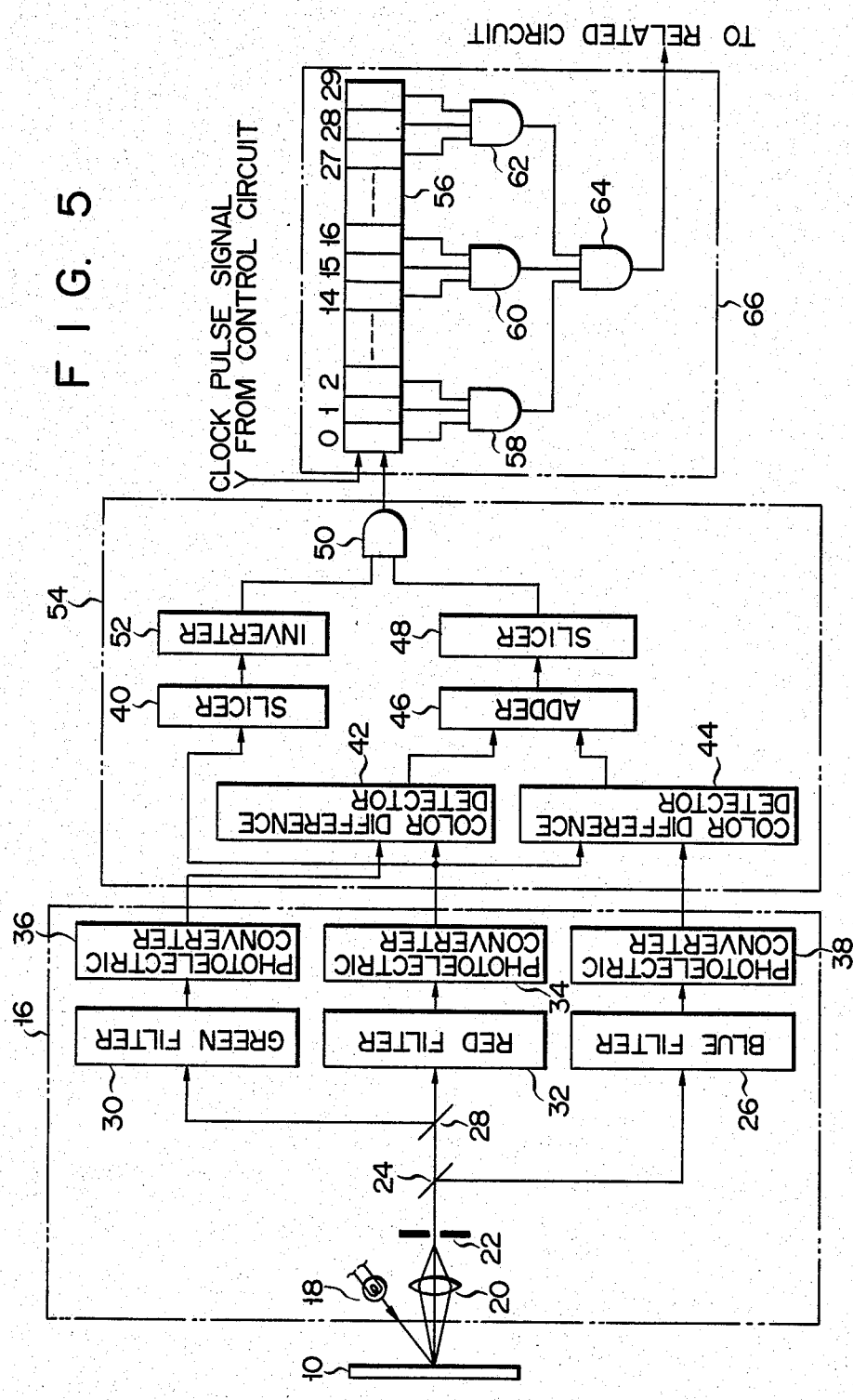

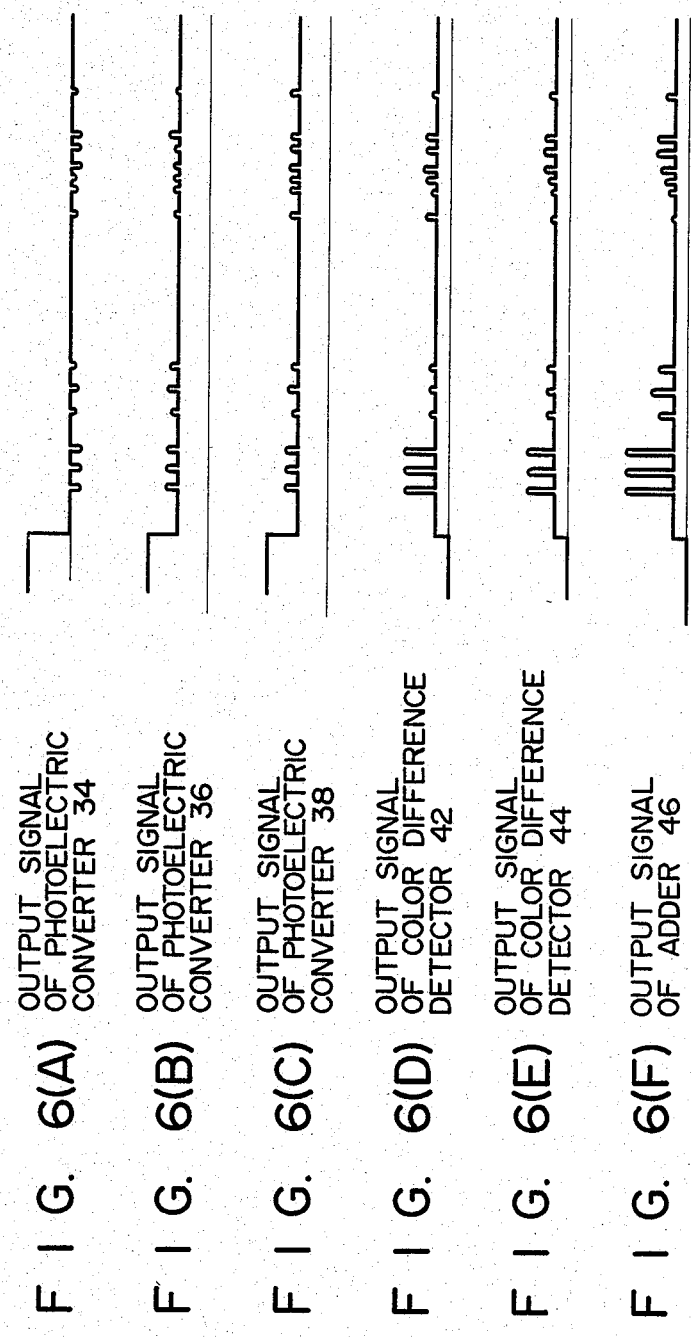

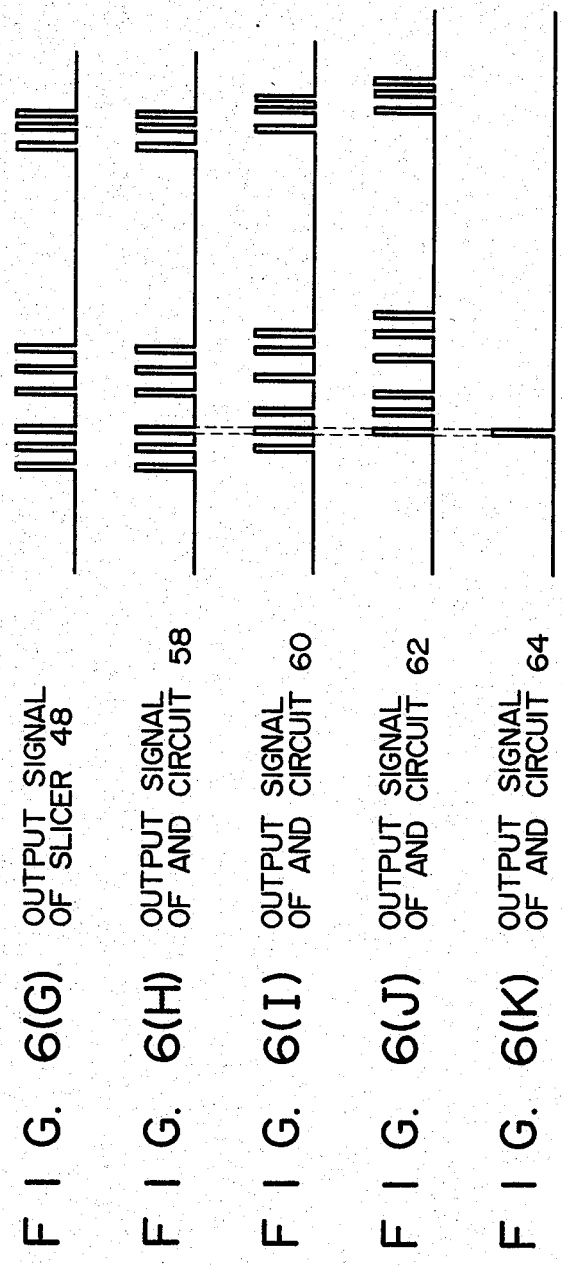

APPARATUS FOR DETECTING SPECIFIC COLOR

BACKGROUND OF THE INVENTION

This invention relates to an apparatus for detecting specific color and, more particularly, to an apparatus which can reliably detect a specific color even if the background is dark.

A metered impression 12 that is printed on postal matter 10, as shown in FIG. 1, usually has three bar marks $14_1$, $14_2$ and $14_3$ at the right end. This pattern is red in color.

The pattern 12 is detected by a photoelectric converter section 16 in a metered impression pattern detector as shown in FIG. 2. Specifically, the postal matter 10 is illuminated by light from a light source 18, and reflected light is led through a lens 20, a slit 22 and a first half reflecting mirror 24 to a blue filter 26. Light transmitted through the first half reflecting mirror 24 is led through a second half reflecting mirror 28 to a green filter 30 and a red filter 32.

The blue filter 26 passes blue light, the green filter 30 passes green light, and the red filter 32 passes red light. These filters 26, 30 and 32 also, respectively, pass the blue light, green light and red light component of white light. The light beams from these filters 26, 30 and 32 are led to respective photoelectric converters 38, 36 and 34. The photoelectric converters 34, 36 and 38 convert the incident lights into corresponding electric signals.

The photoelectric converter section 16 comprises the light source 18, lens 20, slit 22, first and second half reflecting mirrors 24 and 28 and blue, green and red filters 26, 30 and 32.

When a metered impression 12 which is printed on a white background is detected by this apparatus, signals as shown in FIGS. 3(A), 3(B) and 3(C) are obtained from the photoelectric converters 34, 36 and 38 corresponding to the respective red, green and blue filters 32, 30 and 26. The color of the metered impression 12 can be detected through the comparison of these signals.

However, when a pattern 12 that is printed on a dark background such as a brown envelope is detected, signals as shown in FIGS. 4(A), 4(B) and 4(C) are obtained from the respective photoelectric converters 34, 36 and 38. These signals are difficult to compare with one another, so that it is difficult to accurately detect the color of the metered impression pattern 12.

SUMMARY OF THE INVENTION

An object of the invention, accordingly, is to provide a specific-color detecting apparatus for detecting specific color which can reliably detect a specific color even when the background is dark.

This object has been achieved by an apparatus for detecting specific color, which comprises color resolving means illuminating a color pattern printed on a predetermined background and resolving the reflected light into a plurality of color components with a specific color filter capable of passing light of a specific color and the specific color component of white light and at least one color filter capable of passing light of a different color and the different color component of white light, photoelectric converter means including a plurality of photoelectric converters connected to the filters of the respective color resolving means for converting the color components into corresponding electric signals, specific color discriminating means connected to the photoelectric converter converting the specific color into a corresponding electric signal for producing a logic "1" signal when the signal representing the specific color is supplied, color difference detecting means connected to the plurality of photoelectric converters for taking the difference between the electric signal concerning the specific color and electric signals concerning other color components to thereby increase the amplitude of the other color component electric signals, slicer means connected to the color difference detecting means for providing a logic "1" signal when a signal produced from the color difference detecting means is above a predetermined level determined on the basis of the specific color and other color components, and AND gate means connected to the specific color discriminating means and also to the slicer means for producing a specific color signal indicative of the detection of the specific color when both these means simultaneously provide logic "1" signals.

According to the invention, the specific color printed on a background is detected roughly through two routes. One of these two routes includes the specific color discriminating means. Through this route, rough discrimination of the specific color can be obtained. The other route includes the color difference detecting means, which determines whether or not there is a specific color pattern, and the slicer means. The outputs of these two routes are ANDed to obtain the specific color signal. Thus, the specific color can be detected more accurately. In addition, the route including the color difference detecting means amplifies the original signal, thus permitting reliable detection of the specific color even in cases where the background is dark.

BRIEF DESCRIPTION OF THE DRAWINGS

By way of example and to make the description clearer, reference is made to the accompanying drawings, in which:

FIGS. 3(A) to 3(C) are waveform charts showing electric signals produced from the photoelectric converter section shown in FIG. 2 when the background is white;

FIGS. 4(A) to 4(C) are waveform charts showing electric signals produced from the electric converter section shown in FIG. 2 when the background is dark;

FIG. 5 is a schematic representation of an embodiment of the specific-color detecting apparatus according to the present invention, which is applied to a metered impression pattern detector; and FIGS. 6(A) to 6(K) are waveform charts showing outputs from main parts of the specific color detecting apparatus shown in FIG. 5.

DETAILED DESCRIPTION OF THE PREFERRED EMBODIMENT

Figure 1:
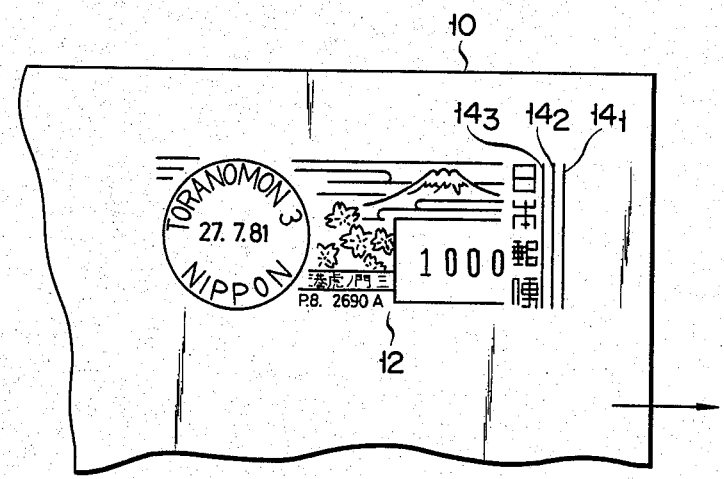
FIG. 1 is a view showing a metered impression pattern.
Figure 2:
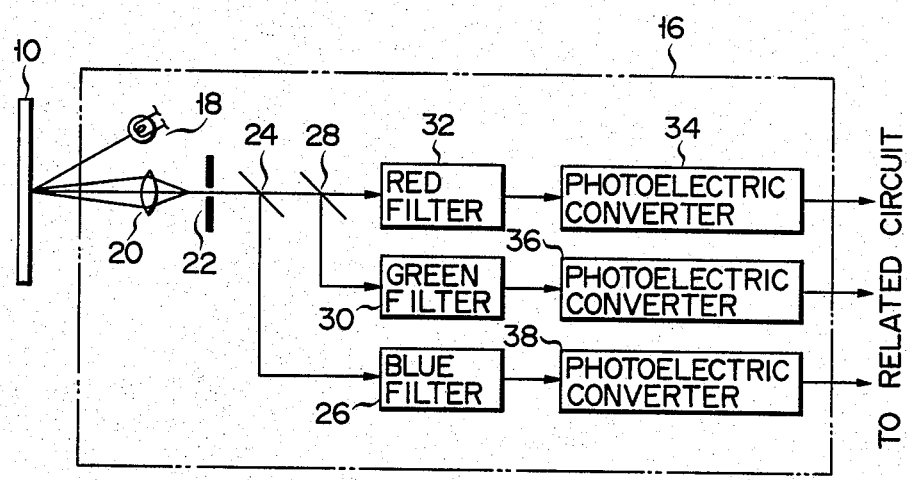
FIG. 2 is a schematic representation of a photoelectric converter section of a prior art metered impression pattern detector.

FIG. 5 is a schematic representation of an embodiment of the specific-color detecting apparatus according to this invention, which is applied to a metered impression pattern detector. In FIG. 5, the same parts as those in FIG. 2 are designated by the same reference numerals, and their detailed description will be omitted.

The output of the red photoelectric converter 34 is supplied to a first slicer 40. The first slicer 40 provides a logic "1" (high level) signal only when the input electric signal is above a predetermined level. When a red or the red light component of white light is received, the output of the red photoelectric converter 34 is at a low level as shown in FIG. 3(A), so that the slicer 40 provides a logic "0" (low level) signal. This means that when the output of the slicer 40 is at the low level, the color pattern may be red or white.

The outputs of the photoelectric converters 34 and 36 are supplied to a first color difference detector 42. This first color difference detector 42 subtracts the output of the photoelectric converter 34 from the output of the photoelectric converter 36 and generates a signal corresponding to the difference.

The outputs of the photoelectric converters 34 and 38 are supplied to a second color difference detector 44. This second color difference detector 44 subtracts the output of the photoelectric converter 34 from the output of the photoelectric converter 38 and generates a signal corresponding to the difference. The outputs of the other color photoelectric converters 36 and 38 are thus, increased in amplitude by the first and second color difference detectors 42 and 44.

The outputs of the first and second color difference detectors 42 and 44 are supplied to an adder 46. The adder 46 adds the outputs of the color difference detectors 42 and 44. If the outputs of the color difference detectors 42 and 44 are in phase, the resulting sum output becomes larger than either output from the detector 42 or 44. The sum output is supplied to a second slicer 48. The second slicer 48 provides a logic "1" (high level) signal only when the input electric signal is above a predetermined level.

The output of the second slicer 48 is supplied to one input terminal of a first AND gate 50, while the output of the first slicer 40 is supplied through an inverter 52 to the other input terminal of the first AND gate 50. The output signal of the first AND gate 50 is the specific color signal. To sum up, the specific color is discriminated roughly through the route consisting of the slicer 40 and inverter 52, while it is examined more closely through the route consisting of the first and second color difference detectors 42 and 44, adder 46 and slicer 48. The specific color signals is generated only when the signals through both routes satisfy decision requirements.

A color detector 54 comprises the first and second color difference detectors 42 and 44, adder 46, first and second slicers 40 and 48, first AND gate 50 and inverter 52.

The output of the first AND gate 50 is supplied to a shift register 56. To the shift register 56 a clock pulse signal is supplied from a control circuit (not shown). The specific color signal supplied from the first AND gate 50 is stored in the shift register 56 while it is progressively shifted therethrough according to the clock pulse signal (which is synchronized to the speed of transfer of the postal matter 10). The shift register 56 may consist of 30 bits. It provides signals from its bits corresponding to the positions of the bar marks $14_1$, $14_2$ and $14_3$ of the metered impression pattern 12. Specifically, the outputs from the 0th to 2nd bits of the shift register 56 are supplied to respective input terminals of a second AND gate 58; the outputs from the 14th to 16th bits to respective input terminals of a third AND gate 60; the outputs from the 17th to 29th bits to respective input terminals of a fourth AND gate 62. The individual bit sets correspond to the width of the respective bar marks $14_1$ to $14_3$. The outputs of the second to fourth AND gates 58, 60 and 62 are supplied to respective input terminals of a fifth AND gate 64. The output of the fifth AND gate 64 is a metered impression pattern detection signal.

A pattern judgement circuit 66 comprises the shift register 56 and second to fifth AND gates 58, 60, 62 and 64.

The operation of the above construction will now be described. A case of detecting a metered impression pattern 12 printed on a brown postal envelope 10 will be taken. The pattern 12 is printed in red. In this case, a signal as shown in FIG. 6(A), is produced from the red photoelectric converter 34, a signal as shown in FIG. 6(B) from the green photoelectric converter 36, and a signal as shown in FIG. 6(C) from the blue photoelectric converter 38. The first color difference detector 42 subtracts the output of the red photoelectric converter 34 from the output of the green photoelectric converter 36 to produce a signal having a larger pulse amplitude as shown in FIG. 6(D). The second color difference detector 44 subtracts the output of the red photoelectric converter 34 from the output of the blue photoelectric converter 38 to produce a signal having a larger pulse amplitude as shown in FIG. 6(E).

The adder 46 adds the outputs of the first and second color difference detectors 42 and 44 to produce a signal having much a larger amplitude as shown in FIG. 6(F). The second slicer 48 slices this signal at a predetermined level to produce a signal as shown in G in FIG. 6.

While the signal processing as described above is being executed, the output of the red photoelectric converter 34 is sliced by the first slicer 40, and the output thereof is inverted by the inverter 52 and supplied to the first AND gate 50. The inverter 52 at this time provides a uniformly high level signal. Thus, the output of the second slicer 48 is directly provided as the specific color signal from the first AND gate 50. The specific color signal represents the red metered impression pattern 12.

The specific color signal is sequentially stored in the shift register 56 when the clock pulse signal occurs. Specifically, the output of the second AND gate 58 goes to the high level (FIG. 6(H)) when the 0th to 2nd bits of the shift register 56 provide "1" signal according to the bar mark $14_1$ of the specific color pattern. Then the outputs of the second and third AND gates 58 and 60 both go to the high level (FIGS. 6(H) and 6(I)) when the 14th to 16th bits of the shift register 56 provide "1" signal according to the signal corresponding to the bar mark $14_1$ while the 0th to 2nd bits provide "1" signal according to a signal corresponding to the bar mark $14_2$.

Then, when "1" signal is provided from the 27th to 29th bits of the shift register 56 according to the signal corresponding to the bar mark $14_1$, from the 14th to 16th bits according to the signal corresponding to the bar mark $14_2$ and from the 0th to 2nd bits according to a signal corresponding to the bar mark $14_3$, the outputs of the second to fourth AND gates 58, 60 and 62 all go to the high level (FIGS. 6(H), 6(I) and 6(J)). Thus, the metered impression pattern detection signal (FIG. 6(K)) is produced.

Although one or two of the outputs of the second to fourth AND gates 58, 60 and 62 goes to the high level when difference signals occur which do not correspond to any bar mark, all of the outputs of the second to fourth AND gates 58, 60 and 62 cannot go at the same time to the high level with these difference signals.

Thus, the metered impression pattern can never be detected erroneously due to noise.

The embodiment described above according to this invention has been given for the sake of illustration only and is by no means limitative. Although, in the above embodiment, a red metered impression pattern on the postal matter 10 has been detected, a different color pattern, for instance a green or blue color pattern may be detected. In this case, it is necessary to change the calculation conditions in the color difference detectors according to the color which is used as a specific color. Further, while in the above embodiment red color has been discriminated from among three colors, i.e., red, green and blue colors, a specific color may be discriminated from among two different colors. In this case, the adder may be omitted, and the output of a color difference detector may be supplied directly to a slicer. Further, specific color may be detected from among four different colors.

Various further changes and modifications are possible without departing from the scope of the invention.

What is claimed is:

1. An apparatus for detecting specific color comprising:

color resolving means illuminating a color pattern printed on a predetermined background and resolving the reflected light into a plurality of color components with a specific color filter capable of passing light of a specific color and at least one color filter capable of passing light of a different color;

photoelectric converter means including a plurality of photoelectric converters connected to said filters of said respective color resolving means filters for converting said color components into corresponding electric signals;

specific color discriminating means connected to the photoelectric converter converting the specific color into a corresponding electric signal for producing a logic "1" signal when the signal representing the specific color is supplied;

color difference detecting means connected to said plurality of photoelectric converters for taking the difference between the electric signal concerning said specific color and electric signals concerning other color components to thereby increase the amplitude of the other color component electric signals;

slicer means connected to said color difference detecting means for providing a logic "1" signal when a signal produced from said color difference detecting means is above a predetermined level determined on the basis of said specific color and other color components; and AND gate means connected to said specific color discriminating means and also to said slicer means for producing a specific color signal indicative of the detection of said specific color when both said means simultaneously provide logic "1" signals.

2. The apparatus for detecting specific color according to claim 1, wherein said color difference detecting means further includes an adder as well as a plurality of color difference detectors, each said color difference detector taking the difference between an electric signal concerning said specific color and an electric signal concerning a different color component and increases the amplitude of said different color component electric signal, said adder taking the sum of the output signals of at least two of said color difference detectors to further increase the amplitude of the output signals of said color difference detectors.

3. The apparatus for detecting specific color according to claim 1, wherein said specific color discriminating means includes a slicer connected to said photoelectric converter for converting said specific color into a corresponding electric signal for providing a logic "0" signal when the electric signal having a level lower than a predetermined level is supplied, and an inverter connected to said slicer for inverting the output signal from said slicer.

4. The apparatus for detecting specific color according to claim 1, wherein said apparatus further comprises pattern judgement means including a register having a plurality of bits for storing the specific color signal from said AND gate means and a pattern judgement circuit for receiving signals from predetermined bits of said register according to said color pattern and providing a specific color detection signal when said signals from predetermined bits fulfill predetermined logic conditions for color pattern are met.

* * * * *